(12) United States Patent
An et al.

(10) Patent No.: US 7,701,960 B2
(45) Date of Patent: *Apr. 20, 2010

(54) APPARATUS AND METHOD FOR DETERMINING PUBLIC LONG CODE MASK IN A MOBILE COMMUNICATIONS SYSTEM

(75) Inventors: Jong Hoe An, Anyang-shi (KR); Chan Ho Kyung, Inchoon (KR); Kyoo Jin Han, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/620,019

(22) Filed: Jan. 4, 2007

(65) Prior Publication Data
US 2007/0104196 A1 May 10, 2007

Related U.S. Application Data

(63) Continuation of application No. 10/855,193, filed on May 26, 2004.

(30) Foreign Application Priority Data

May 29, 2003 (KR) ................ 2003-34236
Aug. 8, 2003 (KR) ................ 2003-55136

(51) Int. Cl.
*H04B 7/216* (2006.01)
(52) U.S. Cl. ........... 370/441; 370/331; 370/436; 370/390; 370/342; 370/432
(58) Field of Classification Search ........ 370/441, 370/331, 436, 390, 342, 432
See application file for complete search history.

(56) References Cited

U.S. PATENT DOCUMENTS

| 6,684,073 | B1 | 1/2004 | Joss et al. | |
|---|---|---|---|---|
| 6,819,918 | B2 * | 11/2004 | Chin et al. | ........ 455/411 |
| 2004/0029596 | A1 | 2/2004 | Kim et al. | |
| 2004/0213280 | A1 | 10/2004 | Patel | |

FOREIGN PATENT DOCUMENTS

RU 2195089 12/2002

(Continued)

OTHER PUBLICATIONS

3GPP ( Multi-carrier Specification for Spread Spectrum Systems on GSM MAP (MC-MAP), Jan. 28, 2000).*

(Continued)

*Primary Examiner*—Patrick N Edouard
*Assistant Examiner*—Muthuswamy G Manoharan
(74) *Attorney, Agent, or Firm*—Lee, Hong, Degerman Kang & Waimey

(57) ABSTRACT

An apparatus and method of assigning a public long code mask (PLCM) to a mobile terminal in a mobile communications network is provided. The invention comprises assigning a first PLCM type, when the PLCM for the mobile terminal is based on an international mobile station identification number that is based on a mobile identification number (MIN) associated with the mobile terminal and assigning a second PLCM type, when the PLCM for the mobile terminal is provided by a service provider.

8 Claims, 8 Drawing Sheets

FOREIGN PATENT DOCUMENTS

| | | |
|---|---|---|
| RU | 2233031 | 7/2004 |
| WO | 00/11835 | 3/2000 |
| WO | WO 01/37453 A1 | 5/2001 |
| WO | WO 2004/098228 A1 | 11/2004 |
| WO | WO 2004/107796 | 12/2004 |

OTHER PUBLICATIONS

3GPP, Signaling link control (LAC) standard for CDMA 2000, TIA/EIA/IS-2000.4-B, May 2002.*

3GGP2: "Multi-carrier Specification for Spread Spectrum Systems on GSM MAP (MCMAP) (Lower Layers Air interface)", 3GPP2 C.S0008-0.

Ravindra Paweardhan, "MEID standards update", Qualcomm, Houston, Texas. Dec. 2003.

3GPP: "Multi-carrier specification for spread spectrum systems on GSM MAP (MCMAP)(Lower Layer Air Interface)" 3GPP2 C.S0008, Jun. 9, 2000.

Chan Ho Kyung, et al: "MSI based PLCM generation"; 3rd Generation Partnership Project 2; TSG-C SWG 2.3, 2003.

Chanho Kyung, et al: "The issues related IMSI-based solution", 3rd Generation Partnership Project 2; TSG-C WG2.3, 2003.

Chan Ho Kyung, et al.: "Revised IMSI-based PLCM", 3rd Generation Partnership Project 2; TSG-C WG2, Aug. 11, 2003.

Chan Ho Kyung, et al.: "IMSI-based PLCM", 3rd Generation Partnership Project 2; TSG-C WG2, 2003.

Chan Ho Kyung, et al.: "State 3 text for the IMSI-based PLCM"; 3rd Generation Partnership Project 2; TSG-C WG2, Jul. 31, 2003.

3RD Generation Partnership Project 2 (3GPP2), "Multi-carrier Specification for Spread Spectrum Systems on GSM MAP (MCMAP) (Lower Layers Air Interface)", 3GPP2 C.S0008-0, Jun. 9, 2000.

TIA/EIA Interim Standard, "Signaling Link Access Control (LAC) Standard for CDMA 2000 Spread Spectrum System", Release B, May 2002.

* cited by examiner

Code channel index (i) :
    '000' : Reverse fundamental channel
    '001' − '111': Reverse supplemental code channel (i = 1,...,7)

MFC : Manufacturer's code

MCC   Mobile country code
MNC   Mobile network code
MSIN  Mobile station identifier number
NMSI  National mobile station identity
IMSI  International mobile station identity

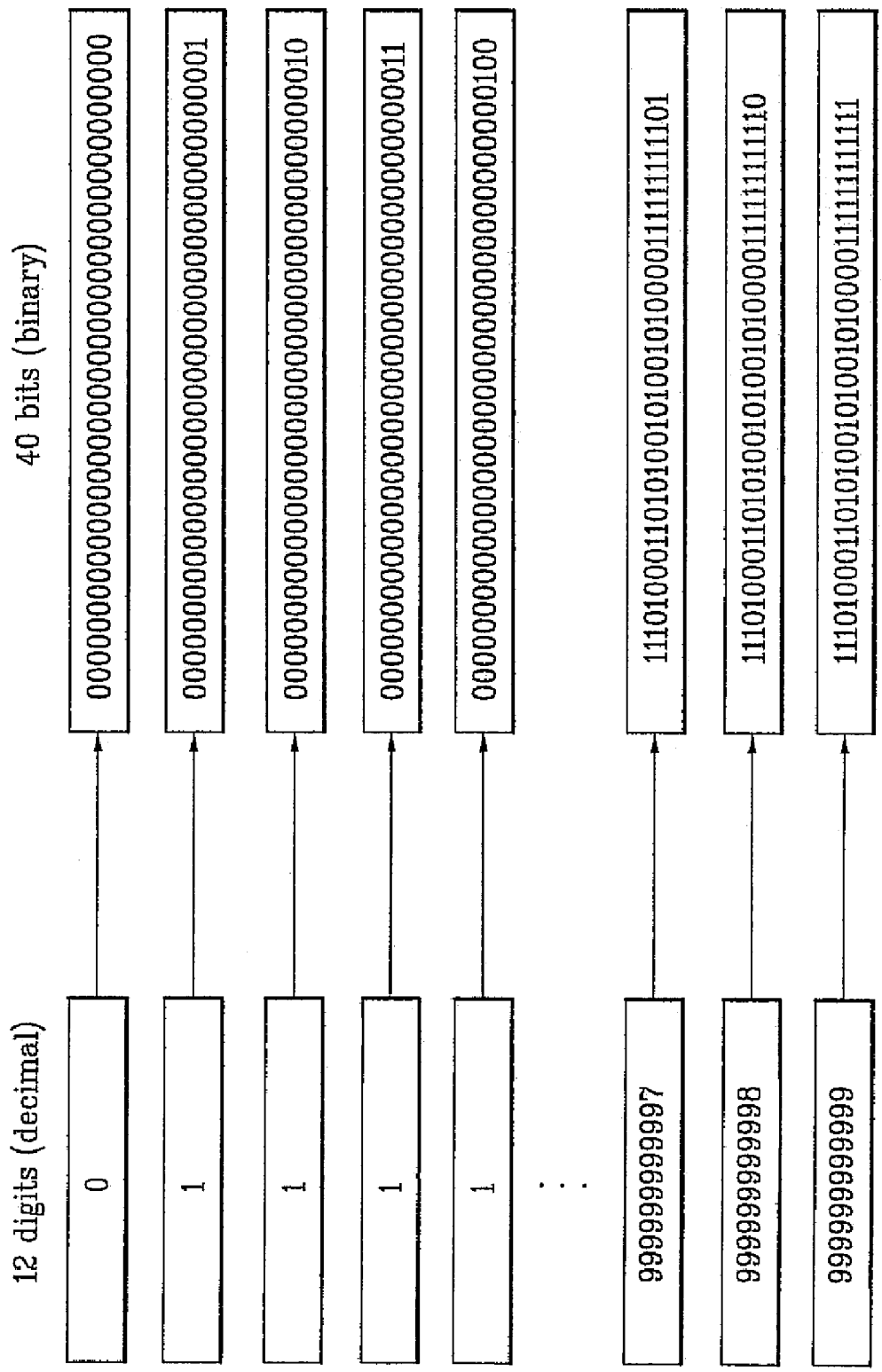

APPARATUS AND METHOD FOR DETERMINING PUBLIC LONG CODE MASK IN A MOBILE COMMUNICATIONS SYSTEM

CROSS-REFERENCE TO RELATED APPLICATIONS

This application is a continuation of U.S. application Ser. No. 10/855,193, filed on May 26, 2004, which claims the benefit of earlier filing date and right of priority to Korean Application Nos. 2003-0034236, filed on May 29, 2003, and 2003-0055136 filed on Aug. 8, 2003, the contents of which are hereby incorporated by reference herein in their entirety.

BACKGROUND OF THE INVENTION

1. Field of the Invention

The present invention relates to an apparatus and method for generating a public long code mask (PLCM) in a mobile communications system.

2. Discussion of the Related Art

Generally, in the cdma2000 communication system, a long code in forward channel is used in ciphering the forward channel and determining the location of a power control bit. Moreover, the long code in a reverse channel is used as an element for identifying each terminal. It also plays a role in reducing interference between subscriber terminals.

A long code is typically constructed with 42 bits. FIG. 1 is a block diagram of a general process of generating a long code and transmitting a signal. The long code, as shown in FIG. 1, is generated according to a 42-bit long code mask. The generated long code undergoes modulo-2 inner product by a transmission signal. The long code mask is separately generated per each channel.

The PLCM format used in the traffic channel is shown in FIG. 2 and FIG. 3. FIG. 2 is a diagram of a PLCM format for a reverse fundamental channel of which radio configuration (RC) is 1 or 2 and a reverse supplemental code channel.

FIG. 3 is a diagram representing a PLCM format for a reverse fundamental channel, a reverse supplemental channel, a reverse dedicated control channel, a forward fundamental channel, a forward supplemental code channel, a forward supplemental channel, a forward dedicated control channel, or a forward packet data channel.

Referring to FIG. 2 and FIG. 3, the PLCM format includes PLCM_37 (M36~M0) constructed with least significant 37 bits of the PLCM. The PLCM_37 can be divided into first least significant bits (M36~M32) and second least significant bits (M31~M0).

A base station can inform a terminal of how to generate the second least significant bits M31~M0 via an extended channel assignment message (ECAM). That is, if a PLCM type PLCM_TYPE in the ECAM is '0000', the mobile station sets the first least significant bits M36~M32 as '11000' and generates the second least significant bits PLCM_32 by performing the following permutation of electronic serial number (ESN).

If ESN={E31, E30, E29, ..., E2, E1, E0}, the second least significant bits PLCM_32 are {E0, E31, E22, E13, E4, E26, E17, E8, E30, E21, E12, E3, E25, E16, E7, E29, E20, E11, E2, E24, E15, E6, E28, E19, E10, E1, E23, E14, E5, E27, E18, E9}.

If the PLCM_TYPE is '0001', the first least significant bits M36~M32 is set to '11011' and the second least significant bits PLCM_32 is set to PLCM_32r which is a 32-bit value received through the extended channel assignment message (ECAM). The ESN is the only identifier allocated to a terminal in the cdma2000 system and is used for call processing.

The structure of an ESN is shown in FIG. 4. The ESN is constructed with 32 bits. A manufacturer's code (MFC) is allocated to the most significant 8 bits and a serial number (SN) of the terminal, manufactured by a corresponding manufacturer, is allocated to the least significant 24 bits. A manufacturer's code is allocated to each manufacturer and is generically set up. If the number of terminals of the corresponding manufacturer exceeds the allocated SNs, a new MFC is allocated.

Meanwhile, it is expected that the 32-bits ESN will be exhausted as a result of product overflow. Hence, a new identifier for identifying a terminal is provided to replace the ESN. The new identifier is a mobile equipment identifier (MEID).

FIG. 5 is a diagram of a structure of a MEID. A MEID is constructed with 56 bits. A manufacturer's code (MFC) is allocated to most significant 32 bits and a serial number (SN) of a terminal manufactured by the corresponding manufacturer is allocated to least significant 24 bits.

In a related art method, a process for permutating the 32-bit ESN over a 42-bit PLCM is used. When using a 56-bit MEID, it is impossible to insert the MEID in the PLCM because the MEID is longer than the PLCM.

As such, when the MEID is used as the identifier for identifying a terminal instead of the ESN, the new method of generating a PLCM is needed.

SUMMARY OF THE INVENTION

In accordance with one embodiment of the invention, a method of determining a public long code mask (PLCM) in a mobile terminal comprises assigning a first PLCM type, when the PLCM for the mobile terminal is based on an international mobile station identification (IMSI) that is based on a mobile identification number (MIN) associated with the mobile terminal; and assigning a second PLCM type, when the PLCM for the mobile terminal is based on the IMSI that is based on a value provided by a service provider.

According to one aspect of the present invention, the first PLCM type is preferably not used when the mobile terminal is not in a home country. Alternatively, the second PLCM type is preferably not used when the mobile terminal is not in a home network.

According to another aspect of the present invention, the PLCM comprises a first portion and a second portion, wherein the second portion is determined from at least a part of the IMSI. Preferably, the second portion of the PLCM comprises 34 bits. When the first PLCM type is being used, the second portion of PLCM is determined from at least a part of the MIN when the first PLCM type is being used.

According to another embodiment of the present invention, a method of determining a public long code mask (PLCM) in a mobile terminal comprises assigning a first PLCM type, when the PLCM for the mobile terminal is based on a mobile equipment identifier (MEID) associated with the mobile terminal; assigning a second PLCM type, when the PLCM for the mobile terminal is specified by a base station; assigning a third PLCM type, when the PLCM for the mobile terminal is based on an international mobile station identification (IMSI) that is based on a mobile identification number (MIN) associated with the mobile terminal; and assigning a fourth PLCM type, when the PLCM for the mobile terminal is based on the IMSI that is based on a value provided by a service provider.

According to one aspect of the present invention, the PLCM for the mobile terminal comprises a first portion and a second portion. Preferably, the first portion comprises most significant bits and the second portion comprises least significant bits of the PLCM.

When the first PLCM type (e.g., PLCM type is equal to '0000') is designated or assigned, then the PLCM value is calculated by applying a hashing algorithm to the MEID. The first PLCM type may be assigned when the mobile terminal is roaming. When the first PLCM type is assigned, the second portion of the PLCM comprises a hashed value of the MEID.

When the second PLCM type (e.g., PLCM type is equal to '0001') is designated or assigned, then the PLCM value is provided to the mobile terminal by the base station. When the second PLCM type is assigned, the second portion comprises a value provided by the base station. Preferably, the first portion of the PLCM comprises '101' and the second portion comprises 39 bits.

When the third PLCM type (e.g., PLCM type is equal to '0010') is designated or assigned, then the PLCM value is derived or based on the MIN in its least significant portion. Preferably, the third PLCM type is not used when the mobile terminal is not in a home country. Also, when the third PLCM type is assigned, the second portion comprises a value based on a MIN associated with the mobile terminal. The second portion comprise at least part of least significant digits of the MIN. More particularly, the second portion may comprise least 10 significant digits of the MIN or alternatively a 34 bit value. The first portion of the PLCM may comprise '11000001' or alternatively, '11000XX1', wherein X is one of zero and 1.

According to one aspect of the present invention, the second portion comprises least significant digits of the MIN in the second portion's least significant positions and comprises padding bits in the second portion's most significant positions, when length of the MIN is smaller than length of the second portion.

When the fourth PLCM type (e.g., PLCM type is equal to '0011') is designated or assigned the PLCM is provided to the mobile terminal by the service provider. In other words, the second portion of the PLCM is not based on the MIN of the mobile terminal. Preferably, the fourth PLCM type is not used when the mobile terminal is not in a home network.

According to one aspect of the present invention, when the fourth PLCM type is assigned, the second portion comprises a 34-bit value and the first portion comprises '11000000', or alternatively, '11000XX0', wherein X is one of zero and 1.

According to another aspect of the present invention includes at least one of the first, second, third, and fourth assigned PLCM types in a first field of a data structure communicated to at least one of the mobile terminal and the base station. Moreover, the invention also includes a second field in a data structure communicated to at least one of the mobile terminal and the base station, wherein a value associated with the second field indicates whether a first field is included in the data structure, wherein the first field includes one of the first, second, third, and fourth assigned PLCM types.

According to another embodiment of the present invention, a method of determining a public long code mask (PLCM) in a mobile terminal comprises receiving from a base station a PLCM type indicator that indicates a type of PLCM to be used in the mobile terminal; and determining at least part of the PLCM based on an international mobile station identification (IMSI) when the PLCM type indicator is equal to a predetermined value. Preferably, the at least part of the PLCM based on the IMSI comprises 34 bits. The IMSI is associated with a mobile identification number of the mobile terminal, when the PLCM type indicator is associated with a first value (e.g., '0010'), and the IMSI is associated with a value provided by the service provider through a base station, when the PLCM type indicator is associated with a second value (e.g., '0011').

According to another embodiment of the present invention, a mobile terminal for using a public long code mask (PLCM) comprises means for assigning a first PLCM type, when the PLCM for the mobile terminal is based on a mobile equipment identifier (MEID) associated with the mobile terminal; means for assigning a second PLCM type, when the PLCM for the mobile terminal is specified by a base station; means for assigning a third PLCM type, when the PLCM for the mobile terminal is based on an international mobile station identification (IMSI) that is based on a mobile identification number (MIN) associated with the mobile terminal; and means for assigning a fourth PLCM type, when the PLCM for the mobile terminal is based on the IMSI that is based on a value provided by a service provider.

According to yet another embodiment of the present invention, a mobile terminal comprises means for receiving from a base station a PLCM type indicator that indicates a type of PLCM to be used in the mobile terminal; and means for determining at least part of the PLCM based on an international mobile station identification (IMSI) when the PLCM type indicator is equal to a predetermined value. Preferably, the at least part of the PLCM based on the IMSI comprises 34 bits. The IMSI is associated with a mobile identification number of the mobile terminal, when the PLCM type indicator is associated with a first value, and the IMSI is associated with a value provided by the base station, when the PLCM type indicator is associated with a second value.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 14 is a diagram illustrating a mapping of a decimal number to a binary value, in accordance with one embodiment.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

To aid describing the present invention, certain exemplary parameter names, values, lengths and other attributes are being used to describe the channels, messages and fix or variable identifiers communicated between mobile and base stations. It should be noted that such parameter names are for illustration purposes only, and that other names may be used to describe the same or similar function.

The present invention generates a PLCM using international mobile station identity (IMSI) number uniquely allocated to each terminal to globally identify a terminal. IMSI is provided in ITU-T E.212 as recommendations related to numbering. ITU-T E.212 was established to allocate a generic number to each globally used terminal and to avoid separate numbering rules in the respective countries by giving a uniform rule to the number.

Figure 1:
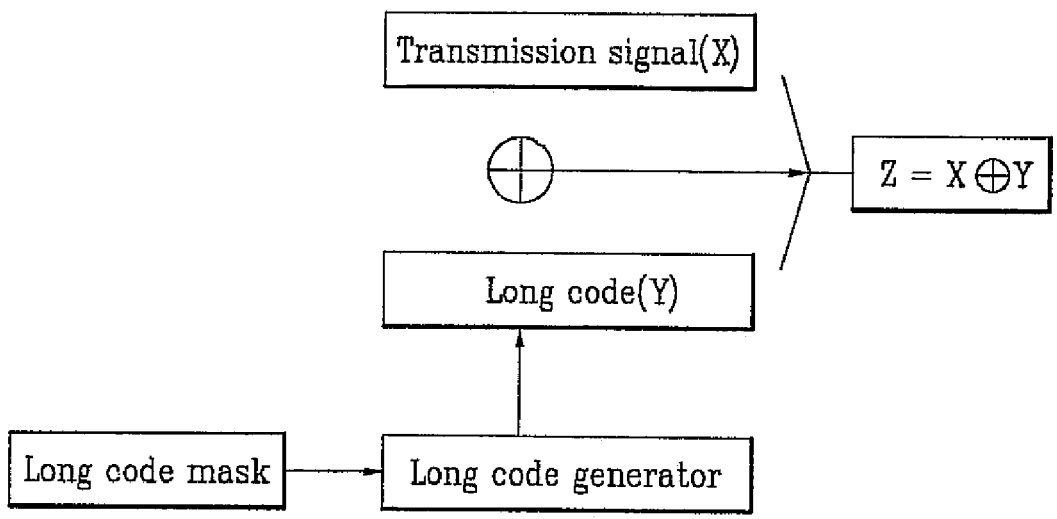
FIG. 1 is a block diagram of a method of generating a long code.
Figure 2:
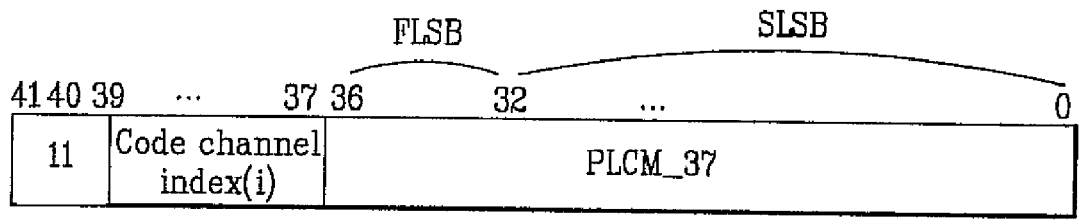
FIG. 2 is a diagram of a PLCM format for a reverse fundamental channel and a reverse supplemental code channel wherein radio configuration (RC) is 1 or 2.
Figure 3:
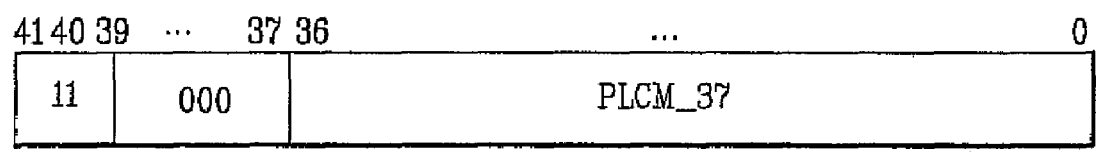
FIG. 3 is a diagram of a PLCM format for a reverse fundamental channel, a reverse supplemental channel, a reverse dedicated control channel, a forward fundamental channel, a forward supplemental code channel, a forward supplemental channel, a forward dedicated control channel, or a forward packet data channel.
Figure 4:
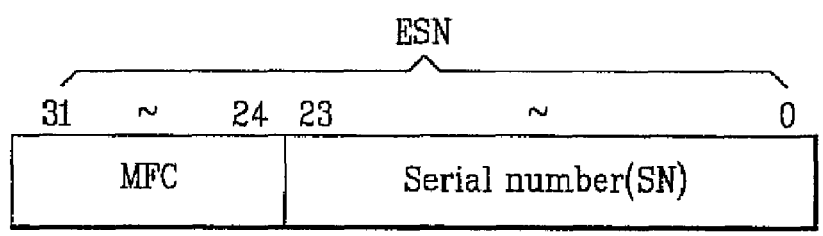
FIG. 4 is a diagram of a structure of an ESN.
Figure 5:
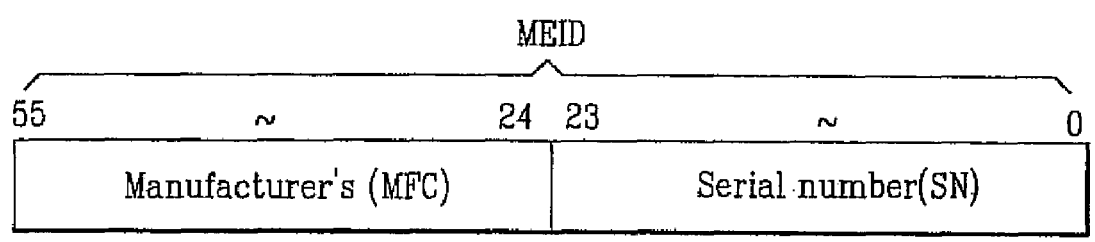
FIG. 5 is a diagram of a structure of a MEID.
Figure 6:
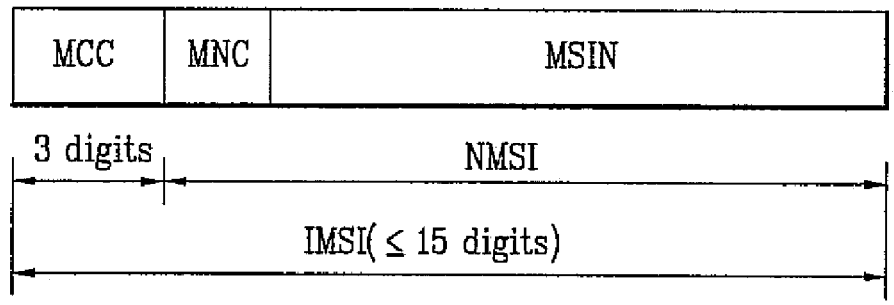
FIG. 6 is a diagram of a structure of an IMSI.

FIG. 6 illustrates a structure of IMSI, in which IMSI preferably comprises up to 15 digits or numerical characters. The most significant 3 digits are allocated to a code for identifying a corresponding country as a mobile country code (MCC). The remaining digits are the National Mobile Subscriber Identity (NMSI). The NMSI comprises a mobile network code (MNC) and a mobile station identification number (MSIN). The MNC identifies a network servicing a terminal. For example, the network may be identified by a service provider providing communications service to the mobile terminal. One provider may have several MNCs. A MSIN (mobile station identifier number) is used for identifying a user terminal in each network.

According to the preferred embodiment, IMSI_M is an IMSI that contains mobile identifier number (MIN) in the NMSI. The MIN is 34 bit number that is a digital representation of the 10-digit number assigned to a mobile terminal and it may be associated with the mobile telephone number. IMSI_T is an IMSI that is not associated with the MIN. The IMSI_T may be provided by the service provider. During operation of the mobile terminal, on operational IMSI value (IMSI_O) is used which is either the IMSI_M or the IMSI_T depending on the base station capabilities.

Figure 7:
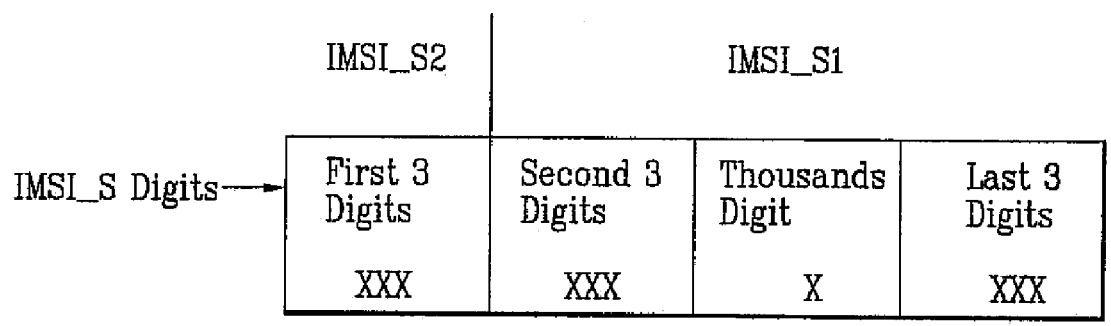
FIG. 7 is a diagram of a structure of 34-bit IMSI_S, in accordance with one embodiment of the invention.

FIG. 7 illustrates IMSI_S digits according to a preferred embodiment of the present invention. An IMSI_S is preferably a 10-digit (34 bit) number derived from the IMSI, preferably from the IMSI_O. In the preferred embodiment, if the IMSI is equal to or greater than 10 digits, least significant 10 digits of the IMSI become the IMSI_S. If the IMSI is smaller than 10 digits, '0' is inserted in the front portion to meet the 10 digits.

Figure 8:
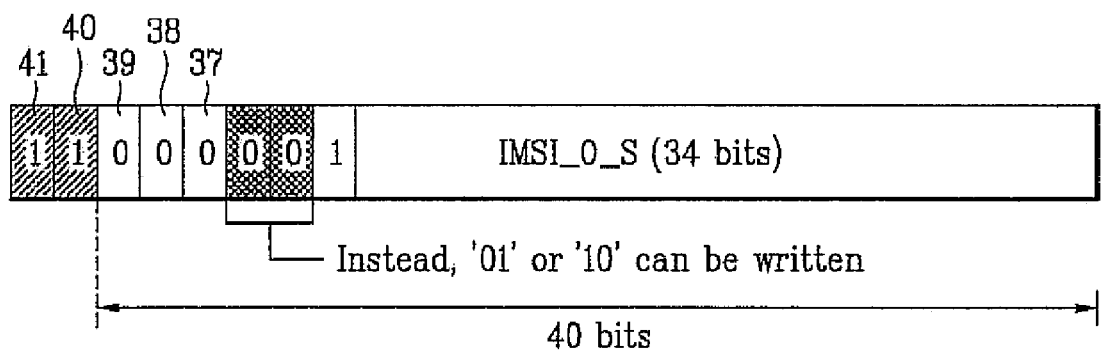
FIG. 8 is an exemplary structure of a PLCM, according to a preferred embodiment of the present invention.
Figure 9:
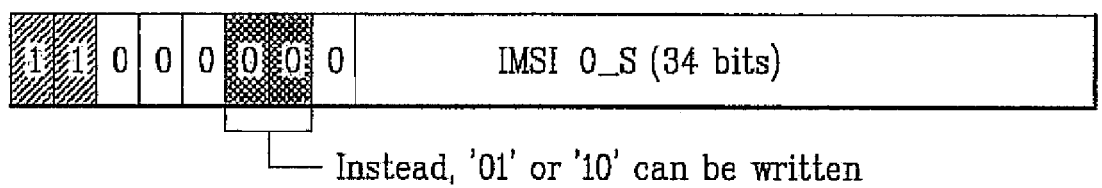
FIG. 9 is an exemplary structure of a PLCM, according to one embodiment of the present invention.

The 10-digit IMSI_S comprises IMSI_S1 (preferably 7 digits) and IMSI_S2 (preferably 3 digits). The IMSI_S derived from the IMSI_O is preferably designated as IMSI_O_S, which is shown in FIGS. 8 and 9.

The following embodiments according to the present invention generating a unique PLCM in a mobile terminal by using the above-described IMSI_S. Therefore, each of the terminals in the same mobile network is able to have a unique PLCM.

In order to generate the PLCM, the ESN or MEID of the mobile terminal may be used. Alternatively, a temporary IMSI can be used. Depending on the base station requirements and limitations, the following PLCM types (PLCM_TYPE) can be defined. For purposes of describing the present invention, the PLCM_TYPE is the PLCM type indicator. The base station sets the PLCM_TYPE to the corresponding type.

According to the preferred embodiment, the PLCM_TYPE is defined as '0010', for example, which is used in extracting operational IMSI (IMSI_O) from IMSI_M based on a MIN (mobile identification number). In another embodiment, the PLCM_TYPE is defined as '0011', for example, which is used in extracting operational IMSI (IMSI_O) from true IMSI (IMSI_T). For example, the PLCM_TYPE of '0010' is not used when the mobile terminal is not in its home country. In other words, when the MCC of the mobile terminal is different from the MCC of the base station. Similarly, the PLCM_TYPE of '0011' is not used when the mobile terminal is not in its home network. In other words, when either the MCC or MNC of the mobile terminal is different.

Referring to FIGS. 8 and 9, a method of generating a PLCM in accordance with a preferred embodiment of the invention is provided. In case that IMSI_O (operational IMSI) is extracted from IMSI_M, (e.g., in case that PLCM_TYPE is '0010'), most significant 5 bits M41~M37, for example, are set to '11000'. Two bits M36 and M35 following the most significant 5 bits M41~M37 are set to '00', for example, to avoid collision with a previously existing long code mask.

The two bits M36 and M35 can be set to '10' or '01', for example, to avoid currently existing long code masks on all physical channels. A subsequent bit M34 may be then set to '1', for example, to be distinguished from the case that IMSI_O is extracted from IMSI_T. Lower 34 bits M33~M0, for example, are set to the previously defined IMSI_S.

Referring to FIG. 9, a method of generating a PLCM in case that IMSI_O (operational IMSI) is extracted from IMSI_T, (e.g., PLCM_TYPE '0011') is provided. Most significant 5 bits M41~M37, for example, are set to '11000'. Two bits M36 and M35, for example, following the most significant 5 bits M41~M37, for example, are set to '00' to avoid collision with a previously existing long code mask.

The two bits M36 and M35 can be set to '10' or '01', for examples to avoid currently existing long code masks of physical channels. A subsequent bit M34, for example, may be then set to '0' to be distinguished from the case that IMSI_O is extracted from IMSI_M. The lower 34 bits M33~M0, for example, are set to previously defined IMSI_S.

Figure 10:
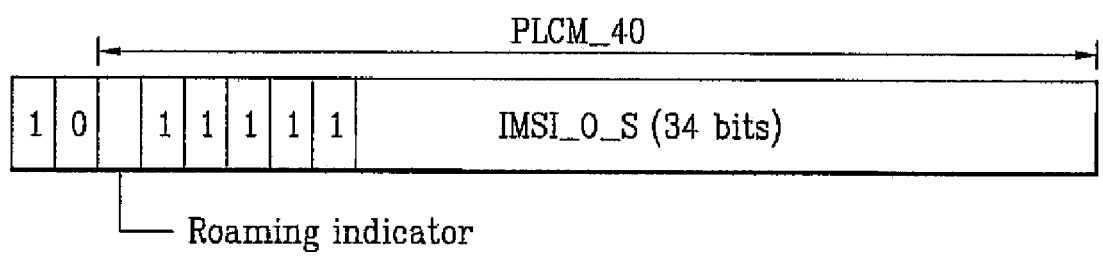
FIG. 10 is an exemplary structure of a PLCM according to another embodiment of the present invention.
Figure 11:
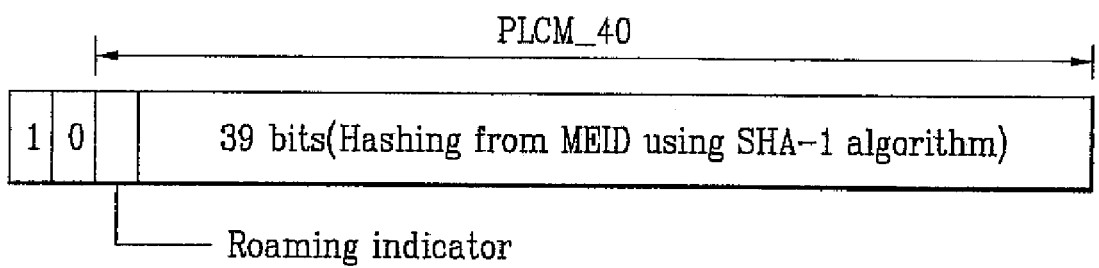
FIG. 11 is an exemplary structure of a PLCM according to another embodiment of the present invention.

Referring to FIGS. 10 and 11, in another embodiment, 1$^{st}$ and 2$^{nd}$ bits of a PLCM are set to '10', for example, to avoid collision with a PLCM used by a prior art mobile terminal. This PLCM is valid in a mobile network where each terminal has a unique PLCM when roaming between separate mobile networks in one country. If a user is roaming in a different mobile network instead of his home network or if the user is roaming in another country, a different PLCM generating method can be used.

In this embodiment, a 3$^{rd}$ bit is used as a roaming indicator. Referring to FIG. 10, arbitrary values can be set for 5 bits M38~M34, respectively. In one embodiment of the present invention, the value for the 5 bits M34~M38 are set to '11111', for example. The PLCM_40 is preferably provided to the physical layer by the signaling layer.

A user may roam from a home network to another mobile network, or another country. When the user communicates in a home network, the roaming indicator is set, for example, to '0'. In such a case, PLCM, as explained in the foregoing description, is extracted from the IMSI_S.

When the user is roaming in a different mobile network instead of his home network or when the user is roaming in another country, the roaming indicator is set, for example, to '1'. In such a case, the PLCM can be generated by a method other than the one discussed above, for example.

In one embodiment, an MEID of the mobile terminal is hashed and inserted in a PLCM. For example, a 56-bit MEID is hashed into 39 bits.

A method of hashing a 56-bit MEID into 39 bits of a PLCM is provided in FIG. 11, according to an embodiment of the present invention. $1^{st}$ and $2^{nd}$ most significant bits are set to '10', for example. A roaming indicator is set to '1', for example, and other 39 bits are set to a hashing value by applying SHA-1 hashing algorithm to a 56-bit MEID, for example. Then, the PLCM_40 is preferably provided to the physical layer by the signaling layer.

Figure 12:
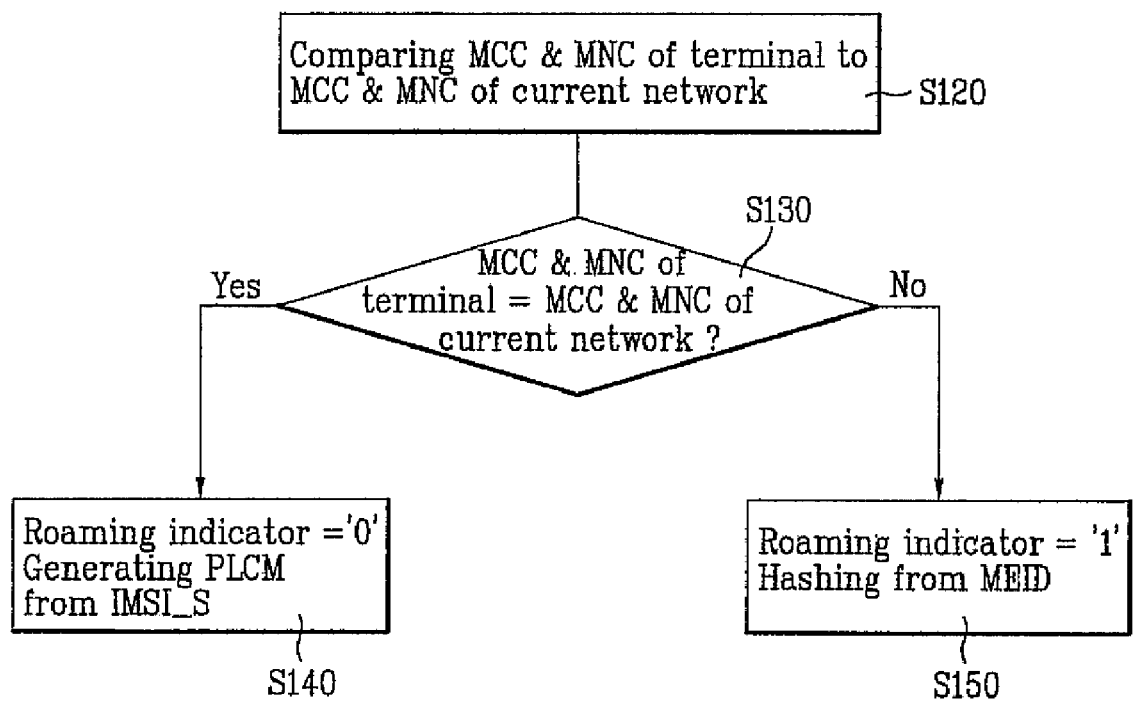
FIG. 12 is a flowchart for determining a PLCM, in accordance with one embodiment.

Referring to FIG. 12, a mobile terminal roaming status can be determined by comparing MCC and MNC of the terminal to MCC and MNC of the servicing network (S120, S130). If any one of the MCCs and MNCs is different, then the user is roaming and a roaming indicator (e.g., $3^{rd}$ bit of the PLCM) is set to '1', for example (S150), and the PLCM is determined using the MEID. Otherwise, if the mobile terminal is in communication with a mobile network to which it belongs, the roaming indicator is set to '0', for example (S140), and the PLCM is determined using the IMSI_S.

Figure 13:
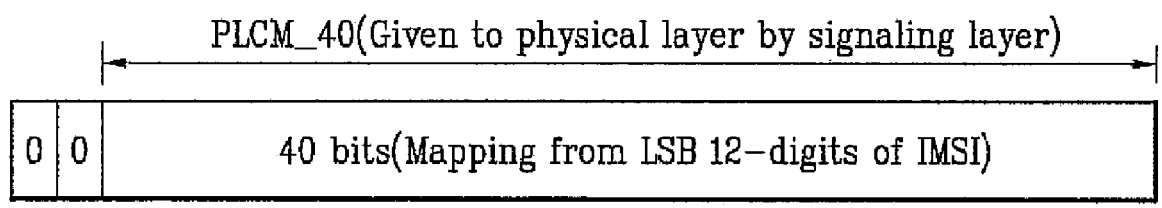
FIG. 13 is a diagram illustrating a mapping of a least significant bits of IMSI to the least significant 40 bits of a PLCM, according to one embodiment of the invention.

In one embodiment, $1^{st}$ to $3^{rd}$ significant digits of IMSI in FIG. 6 are used as MCC and the other 12 digits are used as NMSI that comprises the MNC and the MSIN, as shown. In another embodiment, MSIN is constructed with a 12-digit decimal number from, for example; the least significant 40 bits of PLCM. Referring to FIG. 13, $1^{st}$ and $2^{nd}$ bits of the PLCM can be set to '00', for example. Referring to FIG. 14, a 12-digit decimal number can be mapped to a 40-bit binary value.

It will be apparent to one skilled in the art that the preferred embodiments of the present invention can be readily implemented using, for example, the processor 710 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of mobile communication system, such as cdma2000. The present invention may be also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method of generating a public long code mask (PLCM) in a mobile terminal, the method comprising:
   receiving from a base station a PLCM type indicator that indicates a type of the PLCM to be used in the mobile terminal; and
   generating at least part of the PLCM based on an IMSI_O_S by setting the least significant 34 bits of the PLCM to the IMSI_O_S and setting the most significant 5 bits of the PLCM (M41 through M37) as '11000', when the PLCM type indicator is equal to a first value of '0010' or a second value of '0011',
   wherein an IMSI_O is an operational international mobile station identification (IMSI), and the IMSI_O_S is last 10-digit numbers of the IMSI_O,
   wherein the IMSI_O is derived from an IMSI_M, when the PLCM type indicator is the first value, the IMSI_M is based on a mobile identification number (MIN) of the mobile terminal,
   wherein the IMSI_O is derived from an IMSI_T, when the PLCM type indicator is the second value, the IMSI_T is not associated with the MIN, and
   wherein a size of the PLCM is 42 bits.

2. The method of claim 1, further comprising:
   setting 3 bits of the PLCM (M36 through M34) after the most significant 5 bits of the PLCM (M41 through M37) as '001' when the PLCM type indicator is equal to the first value of '0010'; and
   setting 3 bits of the PLCM (M36 through M34) after the most significant 5 bits of the PLCM (M41 through M37) as '000' when the PLCM type indicator is equal to the second value of '0011'.

3. A mobile terminal for using a public long code mask (PLCM) in a mobile communication system, the mobile terminal comprising:
- a receiving module receiving from a base station a PLCM type indicator that indicates a type of PLCM to be used in the mobile terminal; and
- a PLCM generating module generating at least part of the PLCM based on an IMSI_O_S by setting the least significant 34 bits of the PLCM to the IMSI_O_S and setting the most significant 5 bits of the PLCM (M41 through M37) as '11000', when the PLCM type indicator is equal to a first value of '0010' or a second value of '0011',
- wherein an IMSI_O is an operational international mobile station identification (IMSI), and the IMSI_O_S is last 10-digit numbers of the IMSI_O,
- wherein the IMSI_O is derived from an IMSI_M, when the PLCM type indicator is the first value, the IMSI_M is based on a mobile identification number (MIN) of the mobile terminal,
- wherein the IMSI_O is derived from an IMSI_T, when the PLCM type indicator is the second value, the IMSI_T is not associated with the MIN, and
- wherein a size of the PLCM is 42 bits.

4. The mobile terminal of claim 3, wherein the PLCM generating module sets 3 bits of the PLCM (M36 through M34) after the most significant 5 bits of the PLCM (M41 through M37) as '001' when the PLCM type indicator is equal to the first value of '0010', and
- wherein the PLCM generating module sets 3 bits of the PLCM (M36 through M34) after the most significant 5 bits of the PLCM (M41 through M37) as '000' when the PLCM type indicator is equal to the second value of '0011'.

5. A method of generating a public long code mask (PLCM) in a mobile terminal, the method comprising:
- receiving from a base station a PLCM type indicator that indicates a type of PLCM to be used in the mobile terminal;
- generating the 34 least significant bits of the PLCM (M33 through M0) based on an IMSI_O_S which is derived from IMSI_M and setting the most significant 5 bits of the PLCM (M41 through M37) as '11000', when the PLCM type indicator is equal to '0010'; and
- generating the 34 least significant bits of the PLCM (M33 through M0) based on the IMSI_O_S which is derived from IMSI_T and setting the most significant 5 bits of the PLCM (M41 through M37) as '11000', when the PLCM type indicator is equal to '0011',
- wherein the IMSI_O is an operational international mobile station identification and the IMSI_O_S is last 10-digit numbers of the IMSI_O,
- wherein the IMSI_M is an international mobile station identification (IMSI) that is based on a mobile identifier number (MIN), the IMSI_T is the IMSI that is not associated with the MIN, and
- wherein a size of the PLCM is 42 bits.

6. The method of claim 5, further comprising:
- setting 3 bits of the PLCM (M36 through M34) after the most significant 5 bits of the PLCM (M41 through M37) as '001' when the PLCM type indicator is equal to the first value of '0010'; and
- setting 3 bits of the PLCM (M36 through M34) after the most significant 5 bits of the PLCM (M41 through M37) as '000' when the PLCM type indicator is equal to the second value of '0011'.

7. A mobile terminal for using a public long code mask (PLCM) in a mobile communication system, the mobile terminal comprising:
- a receiving module receiving from a base station a PLCM type indicator that indicates a type of PLCM to be used in the mobile terminal; and
- a PLCM generating module generating the 34 least significant bits of the PLCM (M33 through M0) based on an IMSI_O_S which is derived from IMSI_M and setting the most significant 5 bits of the PLCM (M41 through M37) as '11000', when the PLCM type indicator is equal to '0010' and generating the 34 least significant bits of the PLCM (M33 through M0) based on the IMSI_O_S which is derived from IMSI_T and setting the most significant 5 bits of the PLCM (M41 through M37) as '11000', when the PLCM type indicator is equal to '0011',
- wherein the IMSI_O is an operational international mobile station identification and the IMSI_O_S is last 10-digit numbers of the IMSI_O,
- wherein the IMSI_M is an international mobile station identification (IMSI) that is based on a mobile identifier number (MIN), the IMSI_T is the IMSI that is not associated with the MIN, and
- wherein a size of the PLCM is 42 bits.

8. The mobile terminal of claim 7, wherein the PLCM generating module sets 3 bits of the PLCM (M36 through M34) after the most significant 5 bits of the PLCM (M41 through M37) as '001' when the PLCM type indicator is equal to the first value of '0010', and
- wherein the PLCM generating module sets 3 bits of the PLCM (M36 through M34) after the most significant 5 bits of the PLCM (M41 through M37) as '000' when the PLCM type indicator is equal to the second value of '0011'.

* * * * *